United States Patent Office 2,921,815
Patented Jan. 19, 1960

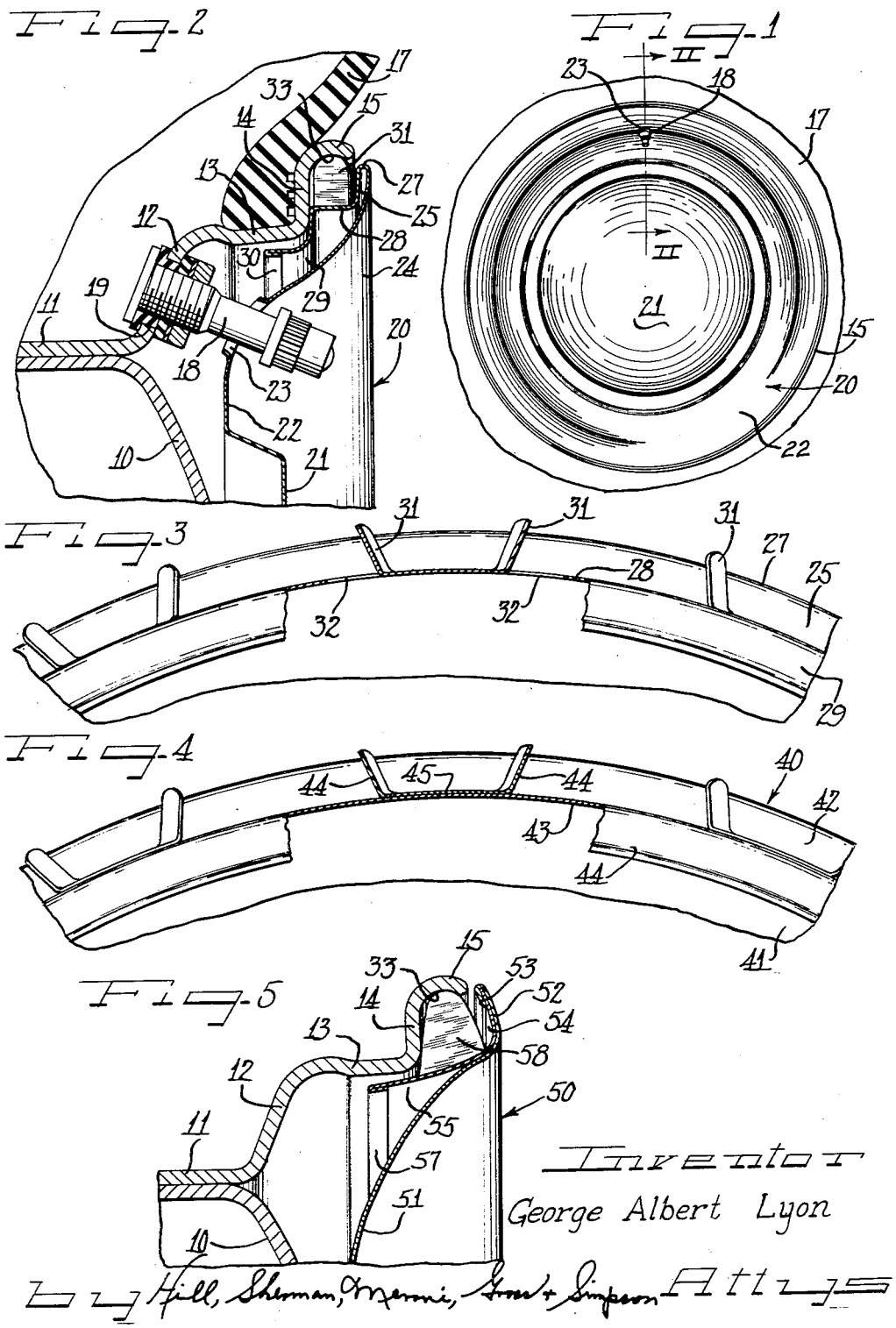

2,921,815

WHEEL COVER

George Albert Lyon, Detroit, Mich.

Application September 3, 1954, Serial No. 454,146

8 Claims. (Cl. 301—37)

The present invention relates to improvements in wheel structures and more particularly concerns the ornamental and protective covering of the outer sides of the wheels.

An important object of the present invention is to provide an improved wheel structure having at the outer side thereof a cover provided with novel means for attaching the cover in snap-on, pry-off relation to the outer side of the wheel.

Another object of the invention is to provide a wheel cover having improved means for attaching the same to a wheel.

A further object of the invention is to provide improved means in a wheel cover for attaching the same to the tire rim of a vehicle wheel.

It is still another object of the invention to provide novel means for securing a wheel cover to the outer side of a vehicle wheel having a tire rim provided with a terminal flange with which the cover retaining means is retainingly engageable in assembly.

Other objects, features and advantages of the present invention will be readily apparent from the following detailed description of certain preferred embodiments thereof taken in conjunction with the accompanying drawing in which:

Figure 1 is a side elevational view of a wheel structure embodying features of the invention;

Figure 2 is an enlarged fragmentary radial sectional view taken substantially on the line II—II of Figure 1;

Figure 3 is a fragmentary rear elevational view partially in section, of a marginal portion of the cover of Figures 1 and 2;

Figure 4 is a rear fragmentary elevational view partially in section of a modified form of the cover; and Figure 5 is a fragmentary radial sectional view through a wheel structure showing a further modification.

A wheel to which the present invention is applied may comprise a disk spider wheel body 10 attached in the usual manner to a tire rim comprising a base flange 11, a side flange 12, facing generally axially outwardly, and merging with a generally radially and axially outwardly directed intermediate flange 13 from which extends a terminal flange having radially outwardly and axially outwardly directed respective portions 14 and 15. The tire rim is adapted to support a pneumatic tire 17 which in the present instance is of the tubeless type. The valve stem 18 is carried by the side flange 12 of the tire rim and extends from a valve stem aperture 19 in such flange.

For application to the outer side of the wheel is a wheel cover 20 which in the present instance comprises a one-piece sheet metal structure made from stainless steel, brass or the like and appropriately externally contoured and finished as by polishing and plating. The wheel cover 20 is of a diameter to substantially cover the outer side of the wheel and includes a central crown portion 21, an intermediate annular dished portion 22 having a valve stem aperture 23, and merging with generally axially outwardly and radially outwardly directed marginal portion 24 which in assembly overlies the tire rim and more particularly the terminal flange portion thereof.

For retaining the cover 20 on the wheel, improved means are provided for engaging with the terminal flange of the tire rim. To this end, the outer marginal portion 24 of the cover is provided therebehind with an underturned flange portion 25 providing at the exposed edge of the cover a turned bead-like finishing rib edge 27. The flange 25 extends radially inwardly a short distance and is then provided with a generally axially inwardly extending intermediate portion 28 which in the present instance is of approximately the same width as the width of the axially extending terminal flange portion 15. From the inner margin of the flange portion 28 extends a radially inwardly and then axially inwardly directed angular reinforcing terminal flange portion 29 dimensioned to extend around the shoulder between the intermediate flange 13 and the terminal flange portion 14 and preferably having its inner margin turned upon itself to provide a reinforcing and finishing terminus bead or flange 30.

In assembly with the wheel, the radially extending portion of the terminal flange 29 provides a seat engageable with the radially inner portion of the radially extending section 14 of the terminal flange. Thereby a substantial chamber is provided within the reentrant angle of the terminal flange, substantially enclosed by the cover flange portions 25 and 28 for accommodating wheel balancing weights or the like, and a gap is afforded between the edge extremity 27 of the cover and the tip of the terminal flange portion 15.

Self retention of the cover 20 on the wheel is provided for by equipping the underturned marginal flange behind the cover portion 24 with a plurality of retaining spring finger elements 31 which in the present instance are preferably struck out from the flange portion 28 leaving apertures 32 therein and angled therefrom in a generally radially outwardly and circumferential oblique direction. The fingers 31 are provided in adjacent pairs divergently related in generally opposite circumferential directions, and the fingers are preferably also angled in the axial direction of the cover divergently from front to rear. The fingers 31 extend radially outwardly to a normally slightly greater extent than the diameter of the inner side of the terminal flange portion 15 which provides a radially inwardly directed groove 33. Thereby, when the cover is to be applied to the outer side of the wheel, the retaining fingers 31 will cam inwardly along the edge extremity of the terminal flange portion 15, with the pairs of fingers deflecting apart and to a smaller diameter as they cam over the radially inwardly projecting portion of the terminal flange edge, and then snap into the groove 33 by radially outward tensioned protractional resilient action or drawing together or movement toward the original extended condition of the fingers. Since there are a substantial number of pairs of the fingers 31 about the periphery of the cover on the flange portion 28, it will be appreciated that the fingers by their radially outward tensioned pressure uniformly about the periphery of the cover against the tire rim terminal flange portion 15 maintain the cover centered on the wheel, and cushioned against radial forces or thrusts. At the same time the fingers by acting against the radially and axially inwardly directed shoulder adjacent the tip of the terminal flange portion 15 draw the cover axially inwardly to seating engagement of the flange portion 29 against the terminal flange portion 14 of the tire rim.

In view of the fact that the fingers provide edges which are preferably retained in the "raw" state from the punching out thereof, and the fingers are angled in respective alternate circumferentially opposite directions, means for retention of the cover against turning on the wheel is afforded. Thereby, the cover will be retained in registration of the valve stem aperture 23 with the valve stem 18 and the valve stem will be maintained against distortion by any tendency of the cover to turn on the wheel.

It will be observed that the terminal edges of the retaining fingers 31 are preferably rounded in side elevation to a generally complementary shape relative to the groove 33 whereby to facilitate thorough retaining gripping engagement of the finger tips within the groove 33. This rounded tip contour of the fingers also facilitates pressing on of the cover into position on the wheel, and, further, pry-off of the cover by insertion of a suitable pry-off tool such as a screw driver behind the edge 27 of the cover and levering against the edge of the terminal flange 15 to force the cover off of the wheel by camming the fingers 31 past the inwardly turned tip of the terminal flange. It will be appreciated, however, that by virtue of the axially inwardly flaring disposition of the pairs of retaining fingers 31, pry-off force of substantial magnitude will have to be applied since while the fingers will press into retaining position fairly easily, they will due to their disposition relative to the tire rim terminal flange substantially resist pry-off. This is desirable for efficiently retaining the cover on the wheel. However, in response to the pry-off force, the entire cover shifts slightly radially toward the opposite side of the wheel as permitted by the resilience of the retaining fingers at said opposite side whereby to relieve the fingers adjacent the point of pry-off from some of the retaining tension, by widening of the distance between the cover flange 28 and the terminal rim flange portion 15, so that as continued pry-off force is exerted axially outwardly the fingers 31 will be forced to deflect radially inwardly and cam axially outwardly past the tire rim terminal flange tip.

In the modification of Figure 4, a cover 40 is disclosed which is preferably in most respects similar to the cover of Figure 2, and therefore only a single illustration of this modification has been shown. The cover 40 comprises a body portion 41 having a turned-back marginal flange 42 provided with a generally axially inwardly directed intermediate portion 43 merging with a radially inwardly and then axially inwardly directed terminal flange portion 44, substantially the same as the under turned flange 25 of the cover 20. However, instead of punching the retaining fingers from the flange portion 43, sets of retaining fingers 44 are provided on the radially outer side of the flange portion 43. The sets of fingers 44 comprise a part of an integral base or body 45 which is attached in suitable fashion, such as by welding, brazing or the like to the cover flange portion 43. For this purpose the fingers 44 are stamped in one piece in generally U-shape with the body portion 45, and with the fingers 44 angled generally radially outwardly and circumferentially in opposite directions and also flaringly angled from the axially outer side to the axially inner side of the cover, substantially as shown, and substantially as described in connection with the fingers 31, so that the fingers 44 will operate cooperatively with the terminal flange of a tire the same as the fingers 31.

The modification of Figure 5 is somewhat different from that shown in either of Figures 2 or 4, but in association with a cover 50 which is constructed and arranged to be applied to the outer side of a wheel the same as the wheel of Figure 2 and accordingly the same reference numerals are applied to the elements of the wheel.

Instead of having retaining fingers located on a flange that is integral in one piece with the cover, the cover 50 comprises a metallic body having a dished intermediate portion 51 bordered by a generally rib-like radially outer marginal portion 52 extending generally radially outwardly and sloping axially inwardly and having an underturned marginal reinforcing and finishing flange 53 adapted to lie in spaced adjacency to the tip of the tire rim terminal flange portion 15. Retained in fixed assembly with the marginal flange portion 52, by the underturned flange 53, is a ring flange 54 nested in behind the marginal portion 52 of the cover and having a generally axially inwardly directed portion 55 arranged to extend axially inwardly and radially inwardly in spaced relation to the axially outer portion of the intermediate flange 13 of the tire rim and having its terminus turned to provide a reinforcing and finishing flange 57.

Struck out from or attached to the flange portion 55 is a series of retaining fingers 58 having the tips thereof projecting normally radially outwardly to a slightly greater diameter than the inside diameter of the terminal flange portion 15 within the groove 33. The fingers 58 are preferably provided in circumferentially oppositely directed relative arrangement, and flaring or tilted relative to the axis of the cover from the axially outer side to the axially inner side similarly as the fingers 31 and 44. In this instance, the axially inner edges of the retaining fingers 58 extend radially inwardly beyond the terminal flange portion 14 and serve as stop shoulders for engagement with the terminal flange portion 14 in the full assembly of the cover on the wheel. Thereby, not only do the retaining fingers 58 retain the cover in axial disposition on the wheel, against both axial inward and axial outward displacement, but also against turning on the wheel. An advantage of the cover 50 is that the outer body portion of the cover can be made from a material that may have low resiliency characteristics, while the ring flange 54 may be made from a different material having the desired characteristics, either of inherent resiliency if the retaining fingers 58 are struck therefrom, or rigidity characteristics while the retaining fingers are made from highly resilient material such as spring steel.

In all forms of the cover the outer margin of the cover is substantially reinforced and rigidified by the retaining finger carrying flange therebehind, and therefore pry-off of the cover is substantially facilitated without danger of damaging the cover. It will also be observed that in the forms of the cover identified as 25 and 40, multi-stage or step shoulders are provided for engagement by a pry-off tool as the cover is worked off of the wheel. In the cover 50 at least the inner reinforced terminal edge of the retaining finger flange may be engaged by the pry-off tool as it is worked in under and behind the cover.

It will be understood that modifications and variations may be effected without departing from the scope of the novel concepts of the present invention.

I claim as my invention:

1. In a wheel structure including a tire rim having a generally radially inwardly facing flange and axially inwardly thereof a generally axially outwardly facing shoulder, a cover for disposition at the outer side of the wheel, a flange behind the cover and facing generally radially outwardly in opposition to said tire rim flange, and wing-like retaining fingers having their major faces directed generally circumferentially and provided with generally outwardly directed edges retainingly engageable with said tire rim flange, said fingers having axially inwardly directed edges engageable against said axially outwardly facing shoulder of the tire rim for positioning the cover in an axially inward relation to the wheel.

2. In a wheel structure including a tire rim having a terminal flange provided with radially and axially extending portions, a cover for disposition at the outer side of the wheel having a radially outer portion for overlying the terminal flange and provided with a retaining flange structure therebehind having generally radially outwardly directed circumferentially angled retaining wing fingers engageable retainingly with the axially extending portion of the terminal flange, said retaining fingers having generally axially inwardly directed edges engageable as stops against the radially extending portion of the terminal flange and maintaining the extremity of the cover spaced from the terminal flange.

3. In a wheel structure including a tire rim having a generally radially inwardly facing flange, a cover for disposition at the outer side of the wheel and having an outer marginal portion of generally annular form and smaller diameter than said rim flange and arranged to face generally radially outwardly in opposition to said rim flange, said annular cover portion being substantially rigid against radial yielding, and a circumferentially spaced series of cover retaining wing-like fingers projecting generally radially outwardly from said annular cover portion and disposed with their major faces oblique not only radially but also axially and with certain of the fingers angled in one circumferential direction and others angled in the opposite circumferential direction so that pairs of the fingers are flaringly disposed both radially and axially, said fingers having respective junctures on said annular cover portion and thus held against any substantial radial yielding, the fingers providing generally radially outwardly directed retaining tips that normally project to a larger diameter than said rim flange, and the fingers being resiliently flexible normal to their major planes and thereby in generally circumferential direction for resiliently yielding generally toward said annular cover portion while moving into retaining engagement with said rim flange and thereby being placed under resilient retaining tension for positive gripping of said rim flange by the tips of the fingers, said fingers being struck out integrally from said annular cover portion and said annular cover portion being reinforced for stiffness at the axially inner sides of the apertures in said cover portion left by the striking out of the fingers by a radially inwardly projecting angular continuous annular flange.

4. In a wheel structure including a tire rim having an annular generally radially inwardly facing flange portion with a generally axially outwardly facing flange portion disposed axially and radially inwardly adjacent to said radially facing flange portion, a cover for disposition at the outer side of the wheel including an annular generally radially outwardly facing portion of smaller diameter than said radially facing rim portion and arranged for telescoping concentric disposition therein and over said axially facing rim flange portion with a turned shoulder at the axially inner side of said annular cover portion for bottoming against said axially facing rim flange to maintain the cover in otherwise spaced axially outward disposition relative to the tire rim, said annular cover portion having axially outwardly of said shoulder a circumferential series of retaining fingers struck therefrom and bent generally radially outwardly, said fingers providing distal retaining tips that normally engage to a substantially larger diameter than said radially facing rim flange and engage retainingly thereagainst under resilient deflection of the fingers relative to the engaged rim flange and said annular cover portion.

5. In a wheel structure as defined in claim 4, said annular cover portion comprising an underturned outer marginal cover flange of generally stepped crross-section with said shoulder that engages the axially outwardly facing rim flange comprising an intermediate generally axially inwardly facing offsetting flange portion and joining a generally axially inwardly extending annular reinforcing and finishing flange.

6. In a wheel structure including a tire rim having an intermediate generally radially inwardly facing flange joining on its axially outer end a terminal flange including a radially outwardly projecting and axially outwardly facing portion merging with a generally radially inwardly facing and axially outwardly extending portion offset radially outwardly substantially from the intermediate flange, a cover for disposition over the outer side of the wheel including a radially outer portion for overlying the intermediate and terminal flanges and having therebehind a generally axially inwardly extending flange portion, the axially inner part of said flange portion being of a diameter to extend telescopically into opposing relation with the axially outer portion of the intermediate flange radially inwardly from the radially extending portion of the terminal flange, said cover flange having between said axially inner portion and the marginal cover portion a portion of an axial extent at least equal to the length of said axially extending terminal flange portion and provided with a circumferentially spaced series of generally radially outwardly extending circumferentially angled wing-like retaining fingers disposed with their major faces facing generally circumferentially and having retaining tips at their radially outer ends normally extending to a slightly larger diameter than the radially inner face of said axially outwardly extending terminal flange portion and retainingly engaging said face in tensioned press-on, pry-off relation, and stop shoulder means adjacent to the radially inner ends of said fingers engaging against said radially extending terminal flange portion adjacent juncture thereof with the intermediate flange and determining the axially inward disposition of the cover on the wheel.

7. A wheel structure as defined in claim 6 wherein said stop shoulder means comprise generally axially inwardly facing edges on the fingers themselves.

8. A wheel structure as defined in claim 6 wherein said stop shoulder means is in the form of an intermediate angled portion of the cover flange facing generally axially inward.

References Cited in the file of this patent

UNITED STATES PATENTS

| | | |
|---|---|---|
| Re. 19,467 | Lyon | Feb. 12, 1935 |
| Re. 22,042 | Lyon | Mar. 3, 1942 |
| 1,800,173 | Anderson | Apr. 7, 1931 |
| 1,889,070 | Hyatt | Nov. 29, 1932 |
| 1,953,634 | Reichenbach | Apr. 3, 1934 |
| 2,698,203 | Landell | Dec. 28, 1954 |
| 2,732,262 | Buerger | Jan. 24, 1956 |